United States Patent Office 3,316,265
Patented Apr. 25, 1967

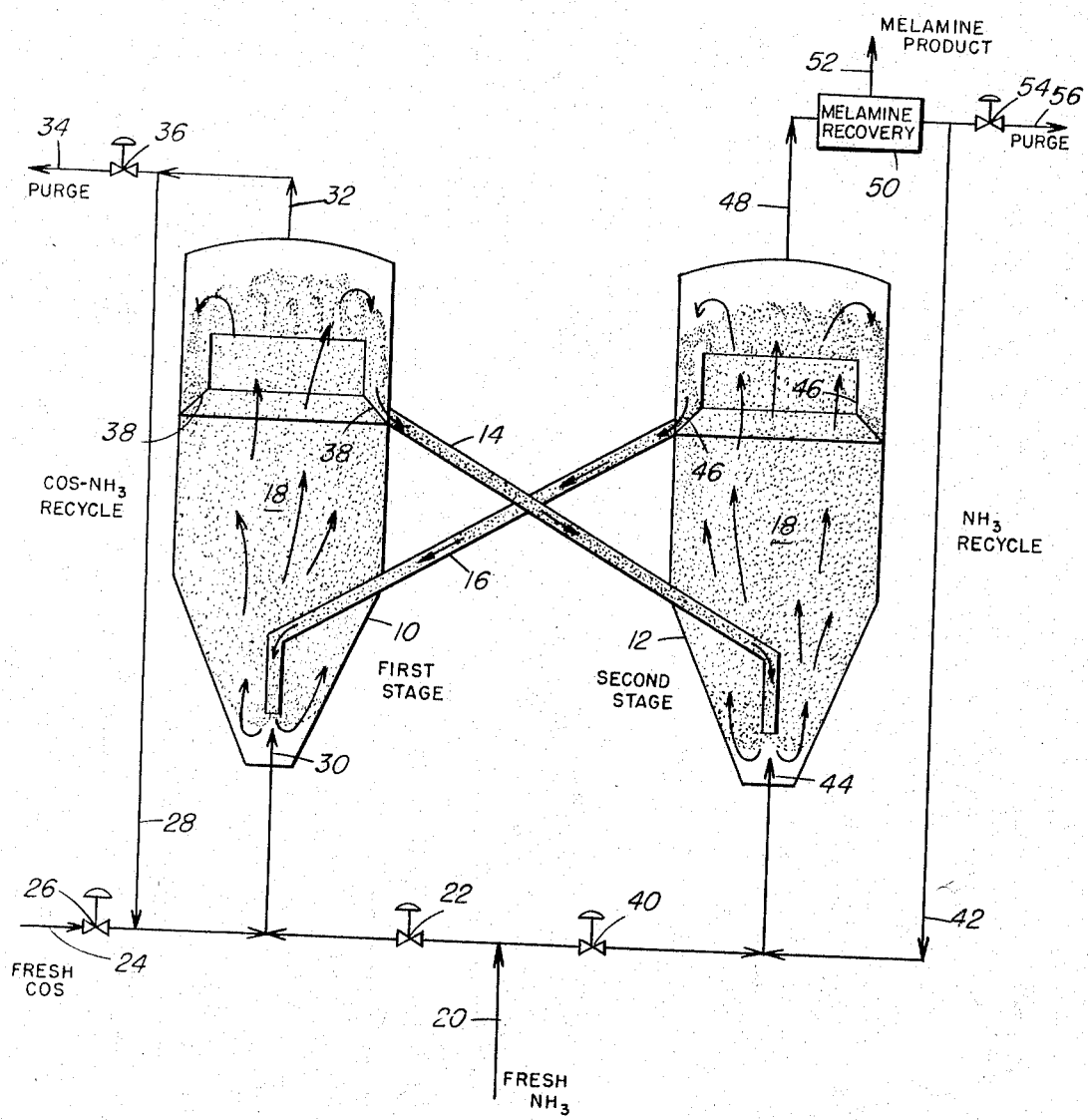

3,316,265
PREPARATION OF MELAMINE
Ralph E. Ringelman, Beaumont, and Thomas W. Higgins, Piscataway, N.J., assignors to Mobil Oil Corporation, a corporation of New York
Filed Feb. 2, 1965, Ser. No. 429,739
17 Claims. (Cl. 260—249.7)

The present invention relates to a catalytic method for the preparation of melamine. More specifically, the invention is directed to a low temperature process at substantially atmospheric pressure for the preparation of melamine by reaction of carbonyl sulfide and ammonia in the presence of a high surface area catalyst.

Melamine is commercially produced from dicyandiamide, a dimer of cyanamide, by heating in the presence of ammonia and methyl alcohol. Essentially, the melamine is a trimer of cyanamide, the original starting material. Melamine may also be produced from urea, see for example, U.S. Patent 2,566,244; 2,649,446; and 2,760,961. Other melamine precursors include biuret, hydrogen cyanide, cyanuric acid, calcuim cyanamid, and the like. The above processes usually require relatively expensive starting materials. Thus, the processes for making melamine from urea are somewhat disadvantageous in that the raw material is also costly and additionally that an on-site urea plant would generally be required for by-product recovery.

Melamine may also be produced from relatively inexpensive materials, carbonyl sulfide and ammonia, according to U.S. Patent 2,557,986. This method, however, is limited by essential conditions of high temperature and pressure. According to the above-cited patent, melamine may be produced from carbonyl sulfide and ammonia at a temperature of at least 270° C., and at a pressure of at least 200 p.s.i. Preferred operating conditions are at 400° C., and 2000 p.s.i.

Thus, present processes for the production of melamine generally involve relatively expensive starting materials or operation under extreme conditions demanding expensive equipment, maintenance and operation. Accordingly, it is a major object of the present invention to provide a process for the preparation of melamine, which process utilizes relatively inexpensive starting materials at relatively mild operating conditions.

Other objects and advantages of the present invention will become apparent to those skilled in the art from the following detailed description and drawing.

Briefly, the present invention embodies the discovery that melamine can be prepared at reasonable temperatures and at substantially atmospheric pressure by the reaction of carbonyl sulfide and ammonia in the presence of a high surface area catalyst.

In one embodiment the present invention is a low-temperature, substantially atmospheric pressure process for the production of melamine, which comprises contacting carbonyl sulfide and ammonia, in an ammonia:carbonyl sulfide mole ratio of at least 1:1, with a high surface area catalyst at a temperature of about 80–150° C., heating said catalyst and conversion products to a temperature of about 250–400° C., passing ammonia over said catalyst and conversion products at a temperature of about 250–400° C., and recovering melamine from the off-gas stream of ammonia, said process being conducted at a pressure between about 0.1 and about 10 atmospheres. It is preferable, in order to effect substantially complete carbonyl sulfide conversion, to employ an initial ammonia:carbonyl sulfide mole ratio of at least 2:1.

In a further embodiment the invention is directed to a continuous catalytic process for the preparation of melamine, which comprises contacting carbonyl sulfide and ammonia, in an ammonia:carbonyl sulfide mole ratio of at least 1:1, with particles capable of fluidization, said particles comprising a high surface area catalyst, at a temperature of about 80–150° C. and at substantially atmospheric pressure; heating said particles and the conversion product thereon to a temperature of about 250–400° C., passing ammonia over said particles at a flow rate sufficient to fluidize said particles, at a temperature of about 250–400° C. and at substantially atmospheric pressure; recovering the overhead product stream; and separating melamine from said overhead product stream.

In an additional embodiment the instant invention provides a continuous catalystic process for the preparation of melamine, which comprises heating particles, comprising a high surface area catalyst and located within a first stage reactor, to a temperature of about 80–150° C.; contacting carbonyl sulfide and ammonia, in an ammonia:carbonyl sulfide mole ratio of at least 1:1, with said particles at a temperature of about 80–150° C. and at substantially atmospheric pressure, thereby producing a conversion product adsorbed on said particles; removing said particles and conversion product thereon to a second stage reactor; heating said particles and conversion product thereon to a temperature of about 250–400° C.; contacting said particles and conversion product thereon with ammonia at a temperature of about 250–400° C. and at substantially atmospheric pressure; recovering melamine from the ammonia off-gas stream; and recycling said particles to said first stage reactor.

The high surface area catalysts suitable for the present process comprise a large number of materials having a surface area of about 100–700 square meters per gram. Various natural clays and zeolites are suitable materials including, for example, bauxite, halloysite, illite, kaolinite, montmorillonite, polygorskite, mordenite, faujasite, diabazite and the like. A more complete list of natural zeolites may be found in U.S. Patent 3,140,252. Also suitable are porous inorganic oxide gels such as silica, alumina, zirconia, beryllia, titania, thoria, strontia or the like including cogels of two or more gels. Particularly preferred are cogels of silica and an oxide of at least one metal selected from the groups consisting of metals of Groups IIA, IIIA and IVB of the Periodic Table. As employed herein, the Groups of the Periodic Table refers to the designation of the common long form, Webster's Third New International Dictionary, G. & C. Merriam Co., Springfield, Mass. (1961). Such preferred cogels include, for example, silica-alumina, silica-magnesia, silica-zirconia, silica-thoria, silica-beryllia, silica-titania, as well as ternary combinaton such as silica-alumina-zirconia, silica-alumina-thoria, silica-alumina-magnesia and the like. Synthetic zeolites may also be employed, including by way of example Zeolites A, X, Y, L, D, R, S, T, Z, E, F, Q, B, ZK–4, and ZK–5, all described in U.S. Patent 3,140,252. The high surface area catalysts may be acid treated to increase surface area or base exchanged to introduce new cationic components. Base exchange of natural and synthetic zeolites is preferred, in order to remove alkali metal ions, and is described in detail in the above-cited U.S. Patent 3,140,252, incorporated herein by reference.

It is also within the purview of the present invention to incorporate the high surface area catalyst in an attrition-resistant matrix, for particularly suitable use in moving-or fluid-bed systems. Matrix materials and methods for incorporating high surface area catalysts (specifically crystalline alumino-silicates) into matrix components are described extensively in the U.S. Patent 3,140,249 reference. Such methods and matrix materials are, of course, suitable for the wide variety of high surface area catalysts employable herein.

Briefly, the essence of the present invention lies in the discovery that melamine may be produced at substantially atmospheric pressure and at reasonable temperatures from carbonyl sulfide and ammonia, by a two-step process in the presence of a high surface area catalyst. In the first step carbonyl sulfide and ammonia, in an ammonia:carbonyl sulfide mole ratio of at least 1:1, are contacted at about 80–150° C. with a high surface area catalyst. Thereafter, the catalyst is heated to about 250–400° C. and contacted with a stream of ammonia. Melamine product is removed in the off-gas ammonia stream and may be recovered by a suitable product recovery procedure.

Preferred temperature are about 135° C. for the first stage and about 350° C. for the second stage.

The process of the present invention may be carried out in a batch system or in a continuous system.

In a suitable batch system, high surface area catalyst particles comprise a fixed bed in a reactor provided with suitable heat transfer means. The catalyst bed is heated to a first-stage temperature in the range of 80–150° C., and ammonia and carbonyl sulfide in at least a 1:1 molar ratio, preferably greater than 2:1, are passed over the catalyst bed. Thereafter, the catalyst bed is heated to a second-stage temperature in the range of 250–400° C., and ammonia is passed over the bed. Melamine is recovered from the ammonia offgas stream. Subsequently, the catalyst bed is cooled to the first-stage temperature for the start of another cycle.

In a preferred batch system, the high surface area catalyst is in the form—either per se or incorporated in a matrix—of fluidizable particles. During the second stage, the ammonia rate is adjusted to fluidize the particle in order to effect more efficient melamine recovery.

In a suitable continuous system, two reactor stages are employed, with means of transferring catalyst particles therebetween. Of necessity, the high surface area catalyst particles are portable, either spheres or beads suitable for moving bed reactor schemes or microspheres suitable for fluid schemes. Preferably the high surface area catalyst is incorporated in an attrition-resistant matrix. In the first stage reactor, ammonia and carbonyl sulfide are contacted in at least a 1:1 mole ratio, preferably greater than 2:1, with moving or fluid catalyst particles at about 80–150° C. Catalyst particles are continuously removed to the second stage reactor where the particles are contacted with ammonia at about 250–400° C. to produce melamine carried from the system in the ammonia offgas stream. Depleted catalyst particles are removed to the first stage for the start of another cycle. Interstage cooling and heating may be provided for the system. Melamine product is of course recovered from the ammonia offgas stream by a suitable recovery scheme.

The principles and advantages of the present invention will be more fully understood by consideration of a preferred embodiment shown in the attached figure, wherein is shown a continuous scheme for the production of melamine according to the present method, employing two fluid catalyst reactors.

More specifically, with reference to the figure, there is shown a first stage reactor 10 and a second stage reactor 12 connected with gravity flow catalyst recycle lines 14 and 16. For simplicity, heat transfer means are not included in the figure, since the particular means employed would be a matter of well-known technology not essential to an understanding of the present invention.

In the operation of the illustrated process scheme, a high surface area catalyst is incorporated in a matrix as microspherical particles 18 fluidized at about 80–150° C. in the first stage reactor 10. Fresh ammonia, from inlet line 20 and controlled by valve 22, and carbonyl sulfide, from inlet line 24 and controlled by valve 26, are combined with COS—NH$_3$ recycle stream from line 28, to provide a carbonyl sulfide and ammonia stream in line 30, having an ammonia:carbonyl sulfide mole ratio of at least 1:1, preferably greater than 2:1, in a quantity sufficient to fluidize catalyst particle 18. Unreacted COS—NH$_3$ offgas is removed from the reactor via line 32. A purge stream 34 is removed through valve 36 in order to prevent by-product buildup in the reactor and a COS—NH$_3$ recycle stream is returned to the reactor via line 28.

Catalyst particles collect in annular trough 38 and are removed to the second stage reactor 12 by gravity flow catalyst recycle line 14. Fresh ammonia from line 20 controlled by valve 40 is combined with recycle ammonia from line 42 and added to the second stage reactor 12 through line 44 in a quantity sufficient to fluidize catalyst particles 18. The fluidized catalyst particles 18 are maintained at about 250–400° C. in the second stage reactor. Suitable means of heating the catalyst particles and of maintaining the reaction temperature include heating elements either in the reactor 12 or located in the recycle line 14. Depleted catalyst particles are collected in annular trough 46 and returned to the first stage reactor 10 via gravity flow recycle line 16.

An ammonia offgas stream containing melamine product is removed from the second stage reactor 12 via line 48 to a melamine recovery section 50. In the melamine recovery section, by suitable means not shown, melamine product is separated from the ammonia offgas stream and recovered through line 52. An ammonia stream is purged through control valve 54 and outlet line 56 in order to prevent by product buildup in the system and an ammonia recycle stream is returned to the second stage reactor 12 via line 42.

Many variations and improvements of the above simplified system are contemplated as within the skill of the art and are, of course, within the purview of the present invention.

The following examples serve to illustrate the method of the present invention without limiting the same:

*Example I*

A glass column, one inch in diameter and six feet long was filled with silica-alumina cracking catalyst of 60–70 mesh to a height of four feet. Gaseous ammonia (480 cc./min.) and carbonyl sulfied (156 ml./min.) were fed to the column. At these flow rates the bed was fluidized. The temperature of the column was maintained at 120–130° C. for two hours. After this time the COS was shut off, the NH$_3$ rate raised to 1200 ml./min., and the column temperature raised to 350° C. at which it was held for two hours. The column was then returned to 120° C., the NH$_3$ rate reduce to 480 cc./min. and the COS reintroduced at the rate of 156 ml./min. This procedure was repeated three more times. About 1.5 g. of material were collected overhead in a condenser maintained at 120° C. Infrared analysis of this product showed it to be about 60% melamine.

*Example II*

Using the reactor described in Example I, 600 cc./min. of NH$_3$ and 148 cc./min. of COS were fed to the column operating at 135° C. for a period of 1½ hours. At the end of this time the COS flow was shut off, the NH$_3$ rate raised to 1400 cc./min. and the column temperature raised to 350° C. This condition was maintained for a period of 1½ hours. During this time 2.50 g. of material which analyzed at 80% melamine was collected overhead. This represented a yield of 18% of theory based on the amount of COS fed to the unit.

It will be evident from the foregoing examples that melamine may be produced from carbonyl sulfide and ammonia at substantially atmospheric pressure and at reasonable temperatures. It will be understood that the above detailed description and figure are merely illustrative of preferred embodiments of the invention. Additional modifications and improvements utilizing the discoveries of the present invention can be readily anticipated by those skilled in the art from the present disclosure, and such modifica-

We claim:

1. A low-temperature, substantially atmospheric pressure process for the production of melamine, which comprises contacting carbonyl sulfide and ammonia, in an ammonia:carbonyl sulfide mole ratio of at least 1:1, with a high surface area catalyst at a temperature of about 80–150° C., heating said catalyst and conversion products to a temperature of about 250–400° C., passing ammonia over said catalyst and conversion products at a temperature of about 250–400° C., and recovering melamine from the off-gas stream of ammonia, said process being conducted at a pressure between about 0.1 and about 10 atmospheres.

2. The process of claim 1 wherein the process is conducted at substantially atmospheric pressure.

3. The process of claim 1 wherein the high surface area catalyst is a porous inorganic oxide having a surface area between about 100 and 700 square meters per gram.

4. The process of claim 1 wherein the high surface area catalyst is a porous inorganic oxide selected from the group consisting of crystalline aluminosilicates, silica, alumina, zirconia, thoria, boria, magnesia, natuarlly-occuring clays and zeolites, and mixtures thereof with one another.

5. The process of claim 1 wherein the high surface area catalyst is silica gel.

6. The process of claim 1 wherein the high surface area catalyst is silica-alumina.

7. The process of claim 1 wherein the high surface area catalyst is silica-alumina-zirconia.

8. The process of claim 1 wherein the high surface area catalyst comprises a crystalline aluminosilicate.

9. The process of claim 1 wherein the high surface area catalyst is incorporated in an attrition-resistant binder therefor.

10. A continous catalytic process for the preparation of melamine, which comprises contacting carbonly sulfied and ammonia, in an ammonia:carbonyl sulfide mole ratio of at least 2:1, with particles capable of fluidization, said particles comprising a high surface area catalyst, at a temperature of about 80–150° C. and at substantially atmospheric pressure; heating said particles and the conversion product thereon to a temperature of about 250–400° C., passing ammonia over said particles at a flow rate sufficient to fluidize said particles, at a temperature of about 250–400° C. and at substantially atmospheric pressure; recovering the overhead product stream; and separating melamine from said overhead product stream.

11. The process of claim 10 wherein the high surface area catalyst is a porous inorganic oxide having a surface area between about 100 and 700 square meters per gram.

12. The process of claim 10 wherein the high surface area catalyst is a porous inorganic oxide selected from the group consisting of crystalline aluminosilicates, silica, alumina, zirconia, thoria, boria, magnesia, naturally-occuring clays and zeolites, and mixtures thereof with one another.

13. The process of claim 10 wherein the high surface area catalyst is incorporated in an attrition-resistant binder therefor.

14. A continuous catalytic process for the preparation of melamine, which comprises heating particles, comprising a high surface area catalyst and located within a first stage reactor, to a temperature of about 80–150° C.; contacting carbonyl sulfide and ammonia, in an ammonia:carbonyl sulfide mole ratio of at least 2:1, with said particles at a temperature of about 80–150° C. and at substantially atmospheric pressure, thereby producing a conversion product adsorbed on said particles; removing said particles and conversion product thereon to a second stage reactor; heating said particles and conversion product thereon to a temperature of about 250–400° C.; contacting said particles and conversion product thereon with ammonia at a temperature of about 250–500° C. and at substantially atmospheric pressure; recovering melamine from the ammonia off-gas stream; and recycling said particles to said first stage reactor.

15. The process of claim 14 wherein the high surface area catalyst is a porous inorganic oxide having a surface area between about 100 and 700 square meters per gram.

16. The process of claim 14 wherein the high surface area catalyst is a porous inorganic oxide selected from the group consisting of crystalline aluminosilicates, silica, alumina, zirconia, thoria, boria, magnesia, naturally-occuring clays and zeolites, and mixtures thereof with one another.

17. The process of claim 14 wherein the high surface area catalyst is incorporated in an attrition-resistant binder therefor.

References Cited by the Examiner

UNITED STATES PATENTS 2,557,986   6/1951   Marsh _____ 260—249.7

WALTER A. MODANCE, *Primary Examiner.*

JOHN M. FORD, *Assistant Examiner.*